US010539819B2

(12) United States Patent
Chen et al.

(10) Patent No.: US 10,539,819 B2
(45) Date of Patent: Jan. 21, 2020

(54) TOUCH PANEL AND MANUFACTURING METHOD THEREFOR, DISPLAY APPARATUS

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Jun Chen, Beijing (CN); Yan Xia, Beijing (CN); Zhanqi Xu, Beijing (CN); Taofeng Xie, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/701,587

(22) Filed: Sep. 12, 2017

(65) Prior Publication Data
US 2018/0074357 A1    Mar. 15, 2018

(30) Foreign Application Priority Data

Sep. 12, 2016 (CN) .......................... 2016 1 0819742

(51) Int. Cl.
*G02F 1/1333* (2006.01)
*G02F 1/1343* (2006.01)
*G06F 3/041* (2006.01)

(52) U.S. Cl.
CPC ........ *G02F 1/13338* (2013.01); *G02F 1/1343* (2013.01); *G06F 3/0412* (2013.01); *G06F 3/0416* (2013.01)

(58) Field of Classification Search
CPC .. G02F 1/13338; G02F 1/1343; G06F 3/0412; G06F 3/0416; G06F 3/044; G06F 2203/04103; G06F 2203/04111
See application file for complete search history.

(56) References Cited

U.S. PATENT DOCUMENTS 9,437,155 B2 *  9/2016  Kung ...................... G06F 3/044
9,652,089 B2 *  5/2017  Liu ........................ G06F 3/044
(Continued)

FOREIGN PATENT DOCUMENTS

CN      105022537 A     11/2015
CN      105183246 A     12/2015
(Continued)

OTHER PUBLICATIONS

Chinese office action dated Aug. 31, 2018 for corresponding application No. 201610819742.6 with English translation attached.

*Primary Examiner* — Tom V Sheng
(74) *Attorney, Agent, or Firm* — Nath, Goldberg & Meyer; Joshua B. Goldberg; Daniel J. Bissing

(57) ABSTRACT

The present application discloses a touch panel having a touch area and a non-touching area at a side of the touch area. The touch panel includes: a base substrate having a first surface and a second surface opposite to each other; a touch sensing electrode provided on the first surface of the base substrate and corresponding to the touch area; a first connection wire on the second surface of the base substrate; and a touch control circuit in the non-touching area. The base substrate is provided with a first through hole, the touch sensing electrode is electrically connected with the first connection wire through the first through hole, and the first connection wire is electrically connected with the touch control circuit. The present application further discloses a (Continued)

manufacturing method for the touch panel and a display apparatus having the touch panel.

20 Claims, 6 Drawing Sheets

(56) References Cited

U.S. PATENT DOCUMENTS

| | | | |
|---|---|---|---|
| 2009/0236151 A1* | 9/2009 | Yeh | G06F 3/0412 |
| | | | 178/18.03 |
| 2014/0062916 A1* | 3/2014 | Hong | G06F 3/041 |
| | | | 345/173 |
| 2015/0097192 A1* | 4/2015 | Araki | G06F 3/0412 |
| | | | 257/72 |
| 2015/0193065 A1* | 7/2015 | Hsieh | G06F 3/0412 |
| | | | 345/174 |
| 2016/0070396 A1* | 3/2016 | Horade | G06F 3/044 |
| | | | 345/174 |
| 2016/0202812 A1* | 7/2016 | Pyoun | G06F 3/0412 |
| | | | 345/173 |
| 2016/0357312 A1* | 12/2016 | Li | G06F 3/044 |
| 2017/0115804 A1* | 4/2017 | Oikubo | H01L 27/323 |
| 2017/0123543 A1* | 5/2017 | Choi | G06F 3/0412 |
| 2017/0185208 A1* | 6/2017 | Liu | G06F 3/0412 |
| 2017/0213873 A1* | 7/2017 | Bok | H01L 27/323 |

FOREIGN PATENT DOCUMENTS

| | | |
|---|---|---|
| CN | 204945980 U | 1/2016 |
| EP | 2660688 A1 | 11/2013 |

* cited by examiner

TOUCH PANEL AND MANUFACTURING METHOD THEREFOR, DISPLAY APPARATUS

FIELD

The present application relates to the field of touch technologies, and particularly, to a touch panel, a manufacturing method therefor, and a display apparatus.

BACKGROUND

Touch sensing electrodes of a touch panel are electrically connected to a touch control circuit through connection wires. In existing touch panels, the connection wires are generally made of a non-transparent metal. Thus, these connection wires are generally arranged in a peripheral area (i.e., an area outside an area where touch operations can be performed) of the touch panel, so as to avoid adverse influence on light transmission. In doing so, it is necessary to reserve a part of the peripheral area to accommodate the connection wires therein. As a result, existing touch display apparatuses have a wide bezel.

Due to limitations on processes, the wide bezel can only be narrowed to a certain extent, even the line width of the connection wire and the pitch between the connection wires are reduced. Moreover, the space of the peripheral area occupied by the connection wires is increased with increasing of the size of the touch display apparatus. Therefore, it is hard to achieve bezel-less or narrow-bezel display products for large-size touch display apparatuses.

SUMMARY

To at least partially address the above technical problems, the present disclosure provides a touch panel, a manufacturing method therefor and a display apparatus that can achieve bezel-less or narrow-bezel display product.

In an aspect, the present disclosure provides a touch panel having a touch area and a non-touching area at a side of the touch area, and the touch panel includes: a base substrate having a first surface and a second surface opposite to each other; a touch sensing electrode provided on the first surface of the base substrate and corresponding to the touch area; a first connection wire on the second surface of the base substrate; and a touch control circuit in the non-touching area, wherein the base substrate is provided with a first through hole, the touch sensing electrode is electrically connected with the first connection wire through the first through hole, and the first connection wire is electrically connected with the touch control circuit.

Optionally, the touch sensing electrode includes a first electrode strip and a second electrode strip arranged perpendicular to each other, the first electrode strip extending in a row direction, the second electrode strip extending in a column direction; and a projection of the first electrode strip on the base substrate at least partially overlaps a projection of the first through hole on the base substrate.

Optionally, the first through hole includes a plurality of first through holes, and a projection of the second electrode strip on the base substrate at least partially overlaps one of the plurality of first through holes corresponding to the second electrode strip on the base substrate.

Optionally, the touch panel further includes a second connection wire on the first surface of the base substrate, and the second electrode strip is electrically connected with the touch control circuit through the second connection wire.

Optionally, the first electrode strip and the second electrode strip are insulated from each other.

Optionally, the base substrate is made of an insulating material and provided with second through holes, and a connection bridge is provided on the second surface of the base substrate; the second electrode strip is disconnected as two second electrode segments at a position where the second electrode strip overlaps the first electrode strip, and the second through holes are respectively provided at positions of the base substrate corresponding to adjacent ends of the two second electrode segments; and the two second electrode segments are electrically connected to each other through the second through holes and the connection bridge.

Optionally, the base substrate is made of an insulating material and provided with second through holes, and a connection bridge is provided on the second surface of the base substrate; the first electrode strip is disconnected as two first electrode segments at a position where the first electrode strip overlaps the second electrode strip, and the second through holes are respectively provided at positions of the base substrate corresponding to adjacent ends of the two first electrode segments; and the two first electrode segments are electrically connected to each other through the second through holes and the connection bridge.

Optionally, the first connection wire extends in the touch area and exits at the side of the touch area, thereby electrically connecting with the touch control circuit.

Optionally, a conductive layer is provided in the first through hole to electrically connect the touch sensing electrode and the first connection wire.

Optionally, the first connection wire is made of any of indium tin oxide, grapheme and silver nanowire.

In another aspect, the present disclosure further provides a manufacturing method for a touch panel having a touch area and a non-touching area at a side of the touch area. The method includes: forming a through hole in a base substrate having a first surface and a second surface opposite to each other; forming a conductive layer in the through hole; forming a touch sensing electrode on the first surface of the base substrate, the touch sensing electrode being provided corresponding to the touch area; forming a connection wire on the second surface of the base substrate; and providing a touch control circuit in the non-touching area; the touch sensing electrode is formed to be electrically connected with the connection wire through the through hole, and the connection wire is formed to be electrically connected with the touch control circuit.

Optionally, the conductive layer is formed in the through hole through an electroplating process.

In another aspect, the present disclosure further provides a display apparatus, including the touch panel described herein or fabricated by the method described herein.

The touch panel of the present disclosure has a touch sensing electrode on its first surface and a connection wire on its second surface, which are electrically connected via a through hole. One end of the connection wire on the second surface is electrically connected with the touch sensing electrode on the first surface via the through hole, and the other end thereof is electrically connected with the touch control circuit in the non-touching area. As such, the connection wire is not necessary to be in the peripheral area of the touch panel at its top side, such that requirements for bezel-less products or narrow-bezel products can be achieved. The touch panel of the present disclosure is suitable for various display apparatuses, particularly suitable for large size touch display apparatuses.

BRIEF DESCRIPTION OF THE FIGURES

The following drawings are merely examples for illustrative purposes according to various disclosed embodiments and are not intended to limit the scope of the present invention, in which.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Touch sensing electrodes of a touch panel are electrically connected to a touch control circuit through connection wires. In existing touch panels, the connection wires are generally made of a non-transparent metal. Thus, these connection wires are generally arranged in a peripheral area (i.e., an area outside an area where touch operations can be performed) of the touch panel, so as to avoid adverse influence on light transmission. In doing so, it is necessary to reserve a part of the peripheral area to accommodate the connection wires therein. As a result, existing touch display apparatuses have a wide bezel.

Due to limitations on processes, the wide bezel can only be narrowed to a certain extent, even the line width of the connection wire and the pitch between the connection wires are reduced. Moreover, the space of the peripheral area occupied by the connection wires is increased with increasing of the size of the touch display apparatus. Therefore, it is hard to achieve bezel-less or narrow-bezel display products for large-size touch display apparatuses.

Figure 1:
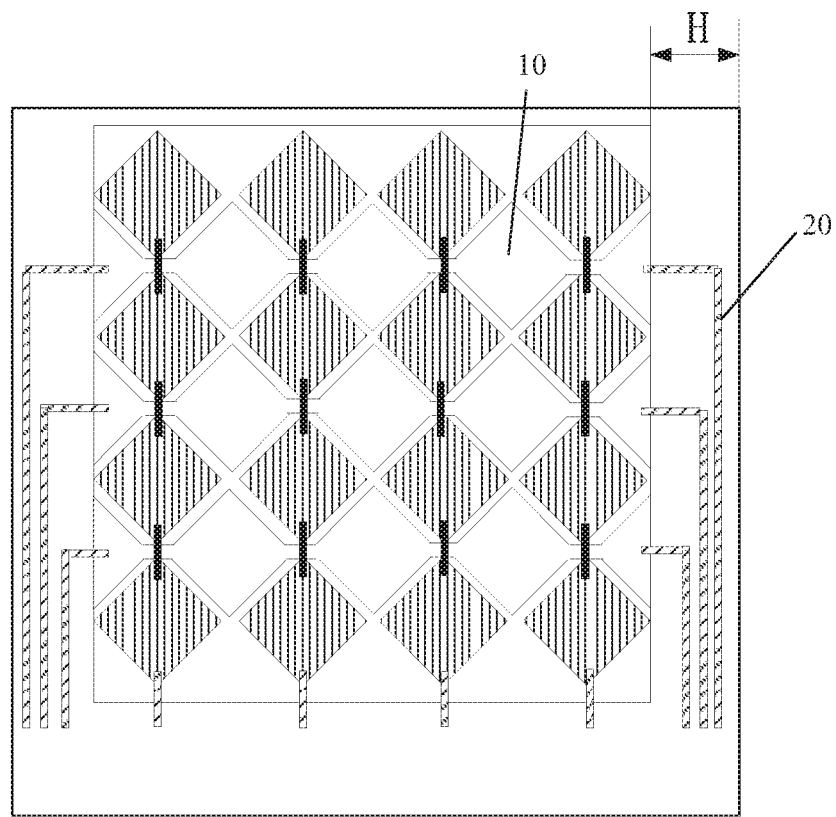
FIG. 1 is a schematic diagram of a structure of an existing touch panel.

FIG. 1 is a schematic diagram of a structure of an existing touch panel. As shown in FIG. 1, the touch panel has a touch area and a peripheral area surrounding the touch area, and the touch area has a plurality of electrode blocks 10 arranged in an array form. The electrode blocks 10 are electrically connected with a touch control circuit (not illustrated) through respective connection wires 20 to send or receive signals. Generally, the connection wires 20 are made of a non-transparent metal. To avoid adverse influence on light transmission, the connection wires 20 are generally arranged in the peripheral area, as shown in FIG. 1. As such, it is necessary to reserve a part of the peripheral area to accommodate the connection wires 20 therein. For example, "H" in FIG. 1 indicates a width of the peripheral area at a side of the touch panel. Therefore, it is hard to achieve bezel-less or narrow-bezel display products for existing touch display apparatuses.

Accordingly, the present disclosure provides, inter alia, a touch panel, a manufacturing method therefor and a display apparatus that substantially obviate one or more of the problems due to limitations and disadvantages of the related art. In one aspect, the present disclosure provides a touch panel having a touch area and a non-touching area at a side of the touch area, and the touch panel includes: a base substrate having a first surface and a second surface opposite to each other; a touch sensing electrode provided on the first surface of the base substrate and corresponding to the touch area; a first connection wire on the second surface of the base substrate; and a touch control circuit in the non-touching area. The base substrate is provided with a first through hole, the touch sensing electrode is electrically connected with the first connection wire through the first through hole, and the first connection wire is electrically connected with the touch control circuit.

As used herein, the term "touch area" refers to an area of the touch panel where touch sensing electrodes are provided to achieve a touch function. Generally, in a final display apparatus, the touch area substantially overlaps the display area of the display apparatus. As used herein, the term "peripheral area" refers to an area that surrounds, partially or completely, the touch area or the display area, and includes circuits, ICs, wires and the like therein. The peripheral area is generally covered by a bezel in the final display product.

Figure 2:
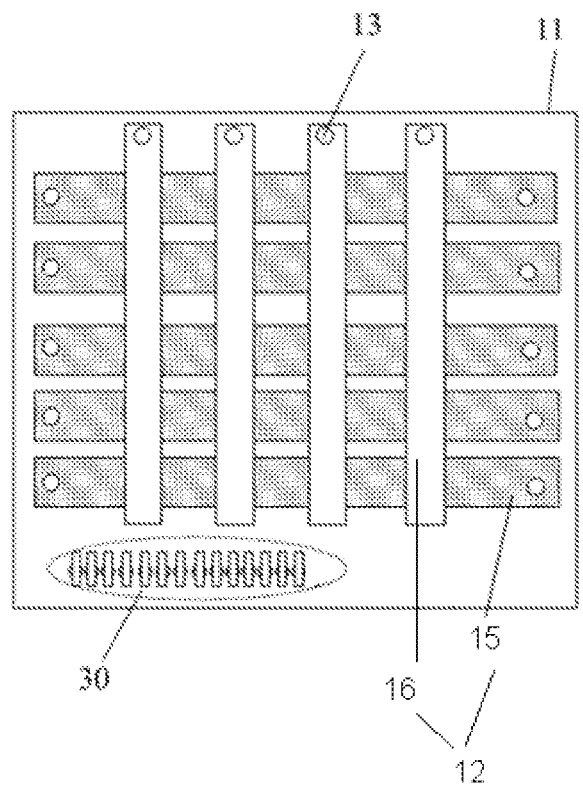
FIG. 2 is a schematic diagram of a structure of a touch panel according to an embodiment of the present disclosure.
Figure 3:
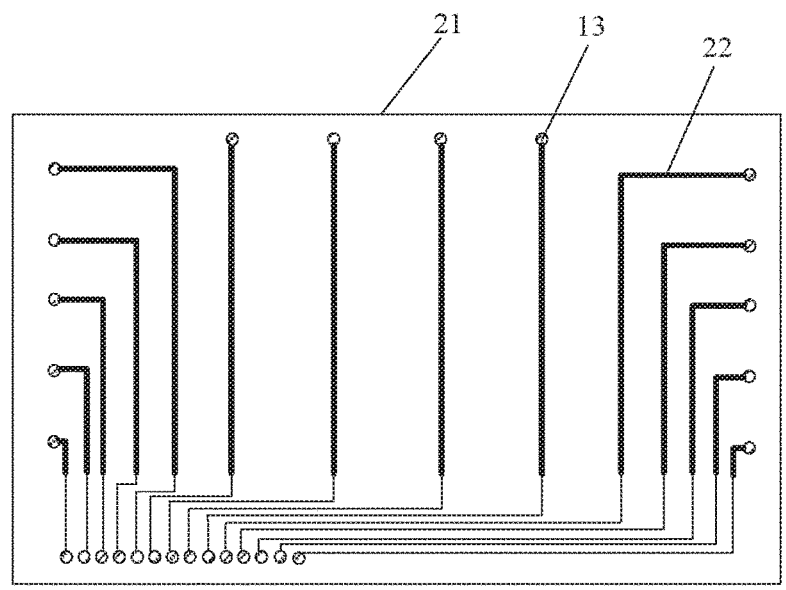
FIG. 3 is a schematic diagram of a structure of a rear side of the touch panel in FIG. 2.

Next, a specific structure of a touch panel according to an embodiment of the present disclosure will be described in detail with reference to FIGS. 2 to 4. FIG. 2 is a view of a top side of a touch panel according to an embodiment of the present disclosure; FIG. 3 is a view of a rear side of the touch panel in FIG. 2; and FIG. 4 is a schematic diagram illustrating a connection between an electrode and a touch control circuit of a touch panel according to an embodiment of the present disclosure.

Figure 4:
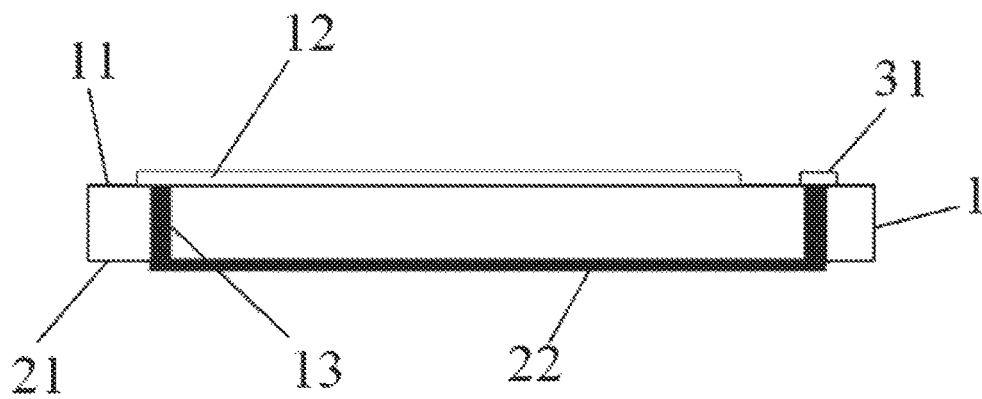
FIG. 4 is a schematic diagram illustrating a connection between a touch sensing electrode and a touch control circuit of a touch panel according to an embodiment of the present disclosure.

As shown in FIGS. 2-4, the touch panel has a touch area and a non-touching area 30 at a side of the touch area. Specifically, the touch panel includes: a base substrate 1 having a first surface 11 (e.g., a top surface) and a second surface 21 (e.g., a rear surface) opposite to each other; a plurality of electrodes 12 (e.g., touch sensing electrodes) on the first surface 11 of the base substrate 1 and defining the touch area; a plurality of first connection wires 22 on the second surface 21 of the base substrate 1; and a touch control circuit 31 in the non-touching area 30. The touch control circuit 31 has a plurality of pins. The base substrate 1 is provided with a plurality of first through holes 13, at least some of the plurality of electrodes 12 are electrically connected with one ends of the plurality of first connection wires 22 through the plurality of first through holes 13, respectively, and the other ends of the plurality of first connection wires 22 are electrically connected with the touch control circuit 31, respectively.

As shown in FIG. 2, the plurality of electrodes 12 are provided on the first surface 11 of the base substrate 1, e.g., the plurality of electrodes 12 includes first electrode strips 15 extending in a row direction and second electrode strips 16 extending in a column direction. The first electrode strips 15 and the second electrode strips 16 are arranged perpendicular to each other. The first through holes 13 are provided, for example, at both ends of the first electrode strips 15 and one ends of the second electrode strips 16. In FIG. 2, projections of one or both ends of the electrodes 12 on the base substrate 1 completely overlap projections of the first through holes 13 on the base substrate 1; however, the present invention is not limited thereto. Projections of one or both ends of the electrodes 12 on the base substrate 1 may partially overlap, or may not overlap, projections of the first through holes 13 on the base substrate 1. Moreover, the electrodes 12 being electrode strips (e.g., first electrode strips 15 and second electrode strips 16) is described herein by way of example, but the present invention is not limited thereto. The electrodes 12 may be of other shapes, such as electrode blocks in FIG. 1.

As shown in FIG. 2, the non-touching area 30 is located at a bottom side of the touch area defined by the plurality of electrodes 12. In the non-touching area 30, the touch control circuit 31 (not shown in FIG. 2) is arranged. The touch control circuit 31 has a plurality of pins. Under each of the pins, a through hole penetrating through the base substrate 1 is provided.

As shown in FIG. 3, on the second surface 21 of the base substrate 1, the plurality of first connection wires 22 are provided. The plurality of electrodes 12 are connected with one ends of the plurality of first connection wires 22 through the plurality of first through holes 13, respectively, and the other ends of the plurality of first connection wires 22 are respectively connected with the touch control circuit 31, e.g., through the through holes under the pins of the touch control circuit 31.

FIG. 4 schematically illustrates a connection between the electrode 12 and the touch control circuit 31. As shown in FIG. 4, in the base substrate 1, the through hole 13 corresponding to one end of the electrode 12 and the through hole under the pin of the touch control circuit 31 are respectively provided. A conductive layer is provided in each of the through holes. The conductive layer is made of a conductive material such as aluminum, copper, or alloy of aluminum and copper. The conductive layer may be formed in each of the through holes by a process such as electroplating. The electrode 12 on the first surface 11 of the base substrate 1 is electrically connected with one end of the first connection wire 22 on the second surface 21 of the base substrate 1 through the through hole 13, and the other end of the first connection wire 22 is electrically connected with the touch control circuit 31 through the through hole under the pin of the touch control circuit 31, such that signals can be received or sent between the electrode 12 and the touch control circuit 31.

The base substrate 1 of the touch panel in the present embodiment is provided with the electrodes 12 on the first surface 11 (e.g., top surface) thereof and with the first connection wires 22 on the second surface 21 (e.g., rear surface) thereof, which are electrically connected via first through holes 13. One ends of the first connection wires 22 on the rear surface are connected with the electrodes 12 on the top surface through the first through holes 13, and the other ends thereof are connected to the non-touching area 30 and thus connected to the touch control circuit 31. In this manner, the connection wires are not necessary to be provided in the peripheral area of the touch panel at its top side, such that a touch panel without bezel at three sides thereof and with a ultra-narrow-bezel at a bottom side thereof can be achieved, thereby satisfying requirements for bezel-less products or narrow-bezel products. An area corresponding to the narrow-bezel at the bottom side is an ink coverage area, and the ink can be selected from black ink, white ink, or color ink. The touch panel is suitable for various display apparatuses, and particularly suitable for large size touch display apparatuses.

Figure 5:
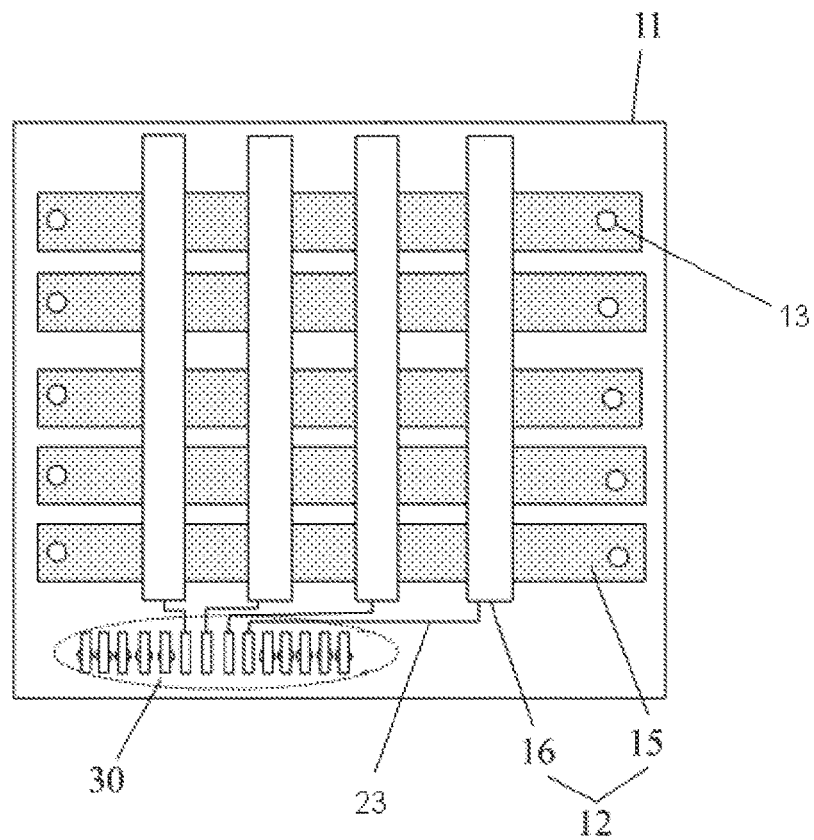
FIG. 5 is a schematic diagram of a structure of a touch panel according to another embodiment of the present disclosure.
Figure 6:
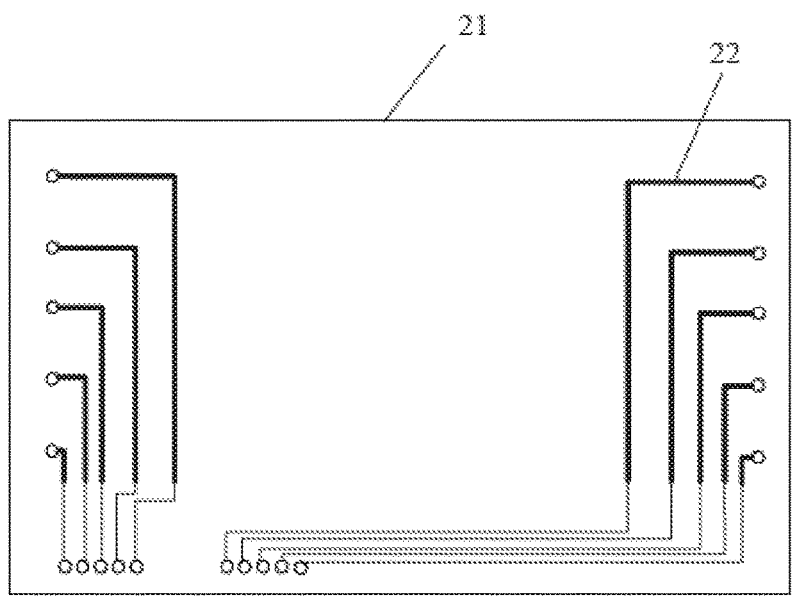
FIG. 6 is a schematic diagram of a structure of a rear side of the touch panel in FIG. 5.

FIGS. 5 and 6 are schematic diagrams of a structure of a touch panel according to another embodiment of the present disclosure. The structure of the touch panel in the present embodiment is substantially the same as that of the touch panel in the above embodiment except that the second electrode strips 16 are electrically connected with the touch control circuit directly through second connection wires 23 provided on the first surface 11 of the base substrate 1.

As shown in FIG. 5, on the first surface 11 of the base substrate 1, the plurality of electrodes 12 are provided, for example, the plurality of electrodes 12 include first electrode strips 15 extending in a row direction and second electrode strips 16 extending in a column direction. First through holes 13 are provided, for example, at both ends of the first electrode strips 15. In FIG. 5, projections of both ends of the first electrode strips 15 on the base substrate 1 completely overlap projections of the first through holes 13 on the base substrate 1; however, the present invention is not limited thereto. Projections of both ends of the first electrode strips 15 on the base substrate 1 may partially overlap, or may not overlap, projections of the first through holes 13 on the base substrate 1.

As shown in FIG. 5, a non-touching area 30 is located at a bottom side of the touch area defined by the plurality of electrodes 12. In the non-touching area 30, a touch control circuit (not shown in FIG. 5) is provided. The touch control circuit has a plurality of pins. In the present embodiment, one ends of the second electrode strips 16 proximal to the non-touching area 30 are electrically connected with the touch control circuit directly through the second connection wires 23 provided on the first surface 11 of the base substrate 1, so that the manufacturing process is simplified. The present embodiment can achieve a similar effect as that of the above embodiment.

As shown in FIG. 6, since the second electrode strips 16 are electrically connected with the touch control circuit directly through the second connection wires 23 provided on the first surface 11 of the base substrate 1, corresponding through holes (namely, through holes under corresponding pins) can be omitted.

It should be appreciated that a case, in which each of all four second electrode strips 16 is electrically connected with the touch control circuit directly through a corresponding one of the second connection wires 23 provided on the first surface 11 of the base substrate 1 and each of all four first electrode strips 15 is connected with the touch control circuit through corresponding first connection wires 22 and corresponding through holes, is illustrated by way of example in FIG. 5, but the present invention is not limited thereto. For example, the electrode strips closer to the non-touching area may be electrically connected with the touch control circuit directly through the connection wires on the top surface of the base substrate, while the electrode strips farther away from the non-touching area are connected with the touch control circuit through the connection wires on the rear surface of the base substrate and corresponding through holes.

Optionally, the first connection wires 22 and the second connection wires 23 are made of any of indium tin oxide, grapheme and silver nanowire. Indium tin oxide, grapheme and silver nanowire are transparent conductive materials, and thus light transmission will not be affected.

Optionally, the first connection wires 22 and the second connection wires 23 are made of any of aluminum, copper and alloy of aluminum and copper. In this case, a line width of metallic connection wire should be less than 5 μm, not distinguishable by human eyes, and thus the light transmission will not be affected. The metal used for making the metallic connection wire may be the same as that of the conductive material filled in the through holes (e.g., first through holes 13 and through holes under the pins of the touch control circuit), e.g., aluminum, copper or alloy of aluminum and copper is possible.

In the above embodiments, the first electrode strips 15 and the second electrode strips 16 are insulated from each other at positions where the first touch electrode strips 15 overlap the second electrode strips 16, so as to avoid crosstalk between signals. In the above embodiments, the first electrode strips 15 and the second electrode strips 16 are insulated from each other by an insulating layer (not shown in the figures) provided therebetween. The insulating layer may be made of, for example, a transparent adhesive.

Figure 7:
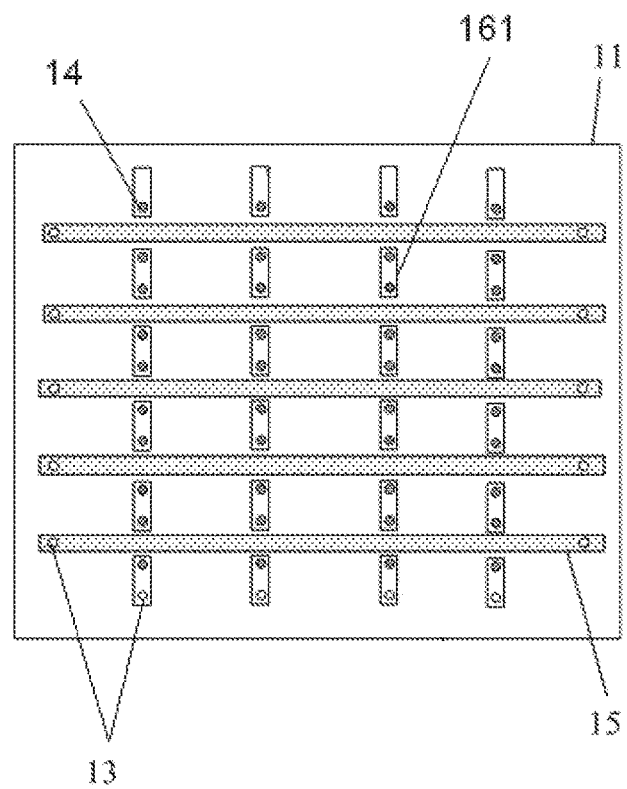
FIG. 7 is a schematic diagram of a structure of a touch panel according to another embodiment of the present disclosure.
Figure 8:
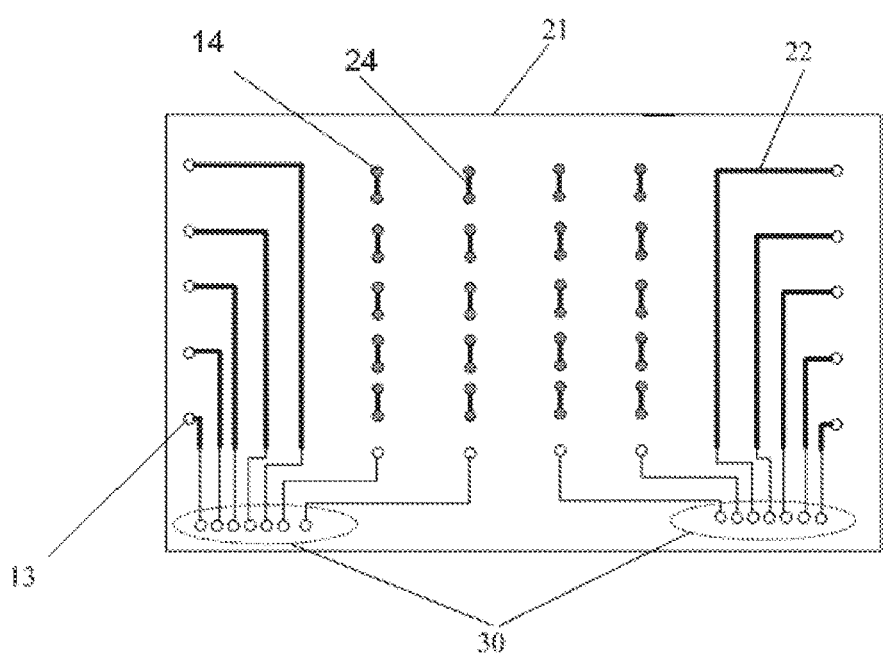
FIG. 8 is a schematic diagram of a structure of a rear side of the touch panel in FIG. 7.

FIGS. 7 and 8 illustrate schematic diagrams of a touch panel according to another embodiment of the present disclosure. FIG. 7 schematically illustrates a structure of a top side of the touch panel, and FIG. 8 schematically illustrates a structure of a rear side of the touch panel. The touch panel of the present embodiment is different from those in the above embodiments in that the insulating layer is not required between the first electrode strips 15 and the second electrode strips 16.

Similar to the above embodiments, in the touch panel of FIG. 7, the first electrode strips 15 are electrically connected with the touch control circuit through the first through holes 13 and the first connection wires 22 provided on the second surface 21 of the base substrate 1, and the second electrode strips 16 are electrically connected with the touch control circuit through the first through holes 13 and the first connection wires 22, or electrically connected with the touch control circuit directly through the second connection wires 23 provided on the first surface 11 of the base substrate 1 (only the former case is illustrated in the present embodiment).

In the present embodiment, the base substrate 1 is made of an insulating material. In the present embodiment, each of the second electrode strips 16 is disconnected at positions where the second electrode strip 16 overlaps the first electrode strips 15, so as to form a plurality of second electrode segments 161, second through holes 14 are provided in the base substrate 1 at positions corresponding to adjacent ends of adjacent second electrode segments 161, and connection bridges 24 are provided on the second surface 21 of the base substrate 1. Adjacent second electrode segments 161 are electrically connected through corresponding second through holes 14 and a corresponding connection bridge 24. Needless to say, it is also possible to form the first electrode strip 15 as a plurality of segments and the second electrode strip 16 as a continuous structure, details of which will not be described herein.

In the present embodiment, in order to maintain the performance of the segmented second electrode strip 16 the same as that of the second electrode strip 16 as a whole, the connection bridges 24 on the rear surface of the base substrate 1 are configured to electrically connect adjacent second electrode segments 161. Typically, the base substrate 1 is made of a glass material and has an insulation property, and thus an additional insulating layer (approximately 1.5 μm in thickness) is not required between the first electrode strips 15 and the second electrode strips 16. Further, a thickness of the base substrate 1 is generally 700 μm or so, and the utilization of the base substrate 1 as the insulating layer can significantly reduce the parasitic capacitance at the overlap regions of the electrodes 12, thereby improving touch sensitivity.

Furthermore, in the touch panel of the present embodiment, two non-touching areas 30 are provided at the bottom side of the touch area, thereby facilitating wiring design for the connection wires and reducing length of the connection wires. Needless to say, the present invention is not limited thereto, more than two non-touching areas may be provided.

In the above embodiments, optionally, the touch panel is a mutual-capacitance touch panel, in which the first electrode strip 15 is a touch electrode, and the second electrode strip 16 is a sensing electrode. Moreover, in the above embodiments, a plurality of touch sensing electrodes have been described by way of example, but the present invention is not limited thereto and only one touch sensing electrode is possible.

Figure 9:
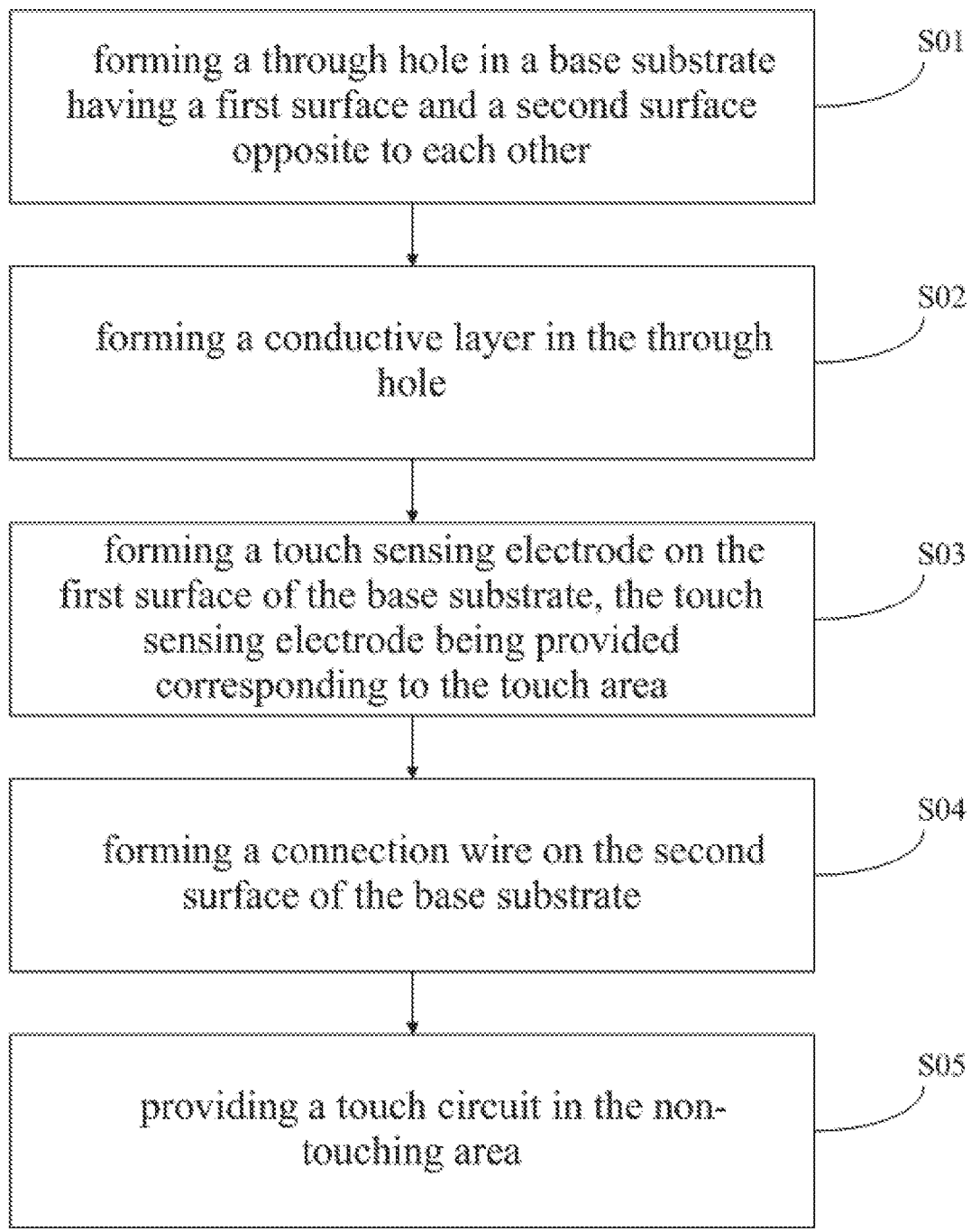
FIG. 9 is a process of manufacturing a touch panel according to an embodiment of the present disclosure.

In another aspect, embodiments of the present disclosure further provide a manufacturing method for a touch panel having a touch area and a non-touching area at a side of the touch area. As shown in FIG. 9, the method includes the following steps S01 to S05.

At step S01, a through hole is formed in a base substrate having a first surface and a second surface opposite to each other.

At step S02, a conductive layer is formed in the through hole. For example, a conductive metal layer is formed in the through hole by an electroplating process. The metal in the through hole may be any one of aluminum, copper, or alloy of aluminum and copper.

At step S03, a touch sensing electrode is formed on the first surface of the base substrate, the touch sensing electrode is provided corresponding to the touch area.

At step S04, a connection wire is formed on the second surface of the base substrate.

At step S05, a touch control circuit is provided in the non-touching area.

In this method, the touch sensing electrode is formed to be electrically connected with the connection wire through the through hole, and the connection wire is formed to be electrically connected with the touch control circuit.

It should be noted that an order of steps S03 and S04 can be adjusted according to actual requirements in production.

Needless to say, specific implementations of the above embodiments can be varied. For example, wiring manner of the connection wires on the rear surface of the base substrate can be designed according to actual needs, and specific size of the through hole can be changed depending on requirements of specific products.

In another aspect, embodiments of the present disclosure further provide a display apparatus including any one of the above touch panels described herein or manufactured by the method described herein. The display apparatus may be any product or component having a display function, such as a liquid crystal display panel, an electronic paper, a mobile phone, a tablet computer, a television, a monitor, a notebook computer, a digital photo frame, a navigator, or the like.

It should be understood that the above implementations are merely exemplary implementations adopted for explaining the principle of the present disclosure, but the present disclosure is not limited thereto. For those skilled in the art, various modifications and improvements may be made without departing from the spirit and essence of the present disclosure, and these modifications and improvements are also considered to be within the protection scope of the present disclosure.

What is claimed is:

1. A touch panel having a touch area and a non-touching area at a side of the touch area, comprising:
a base substrate having a first surface and a second surface opposite to each other;
a touch sensing electrode provided on the first surface of the base substrate and corresponding to the touch area;
a first connection wire on the second surface of the base substrate; and
a touch control circuit in the non-touching area,
wherein the base substrate is provided with a first through hole, the touch sensing electrode is electrically connected with the first connection wire through the first through hole, and the first connection wire is electrically connected with the touch control circuit, and
wherein the touch sensing electrode comprises a first electrode strip and a second electrode strip arranged perpendicular to each other, the first electrode strip extending in a row direction, the second electrode strip extending in a column direction.

2. The touch panel of claim 1, wherein
a projection of the first electrode strip on the base substrate at least partially overlaps a projection of the first through hole on the base substrate.

3. The touch panel of claim 2, wherein the first through hole comprises a plurality of first through holes, and a projection of the second electrode strip on the base substrate at least partially overlaps a corresponding one of the plurality of first through holes on the base substrate.

4. The touch panel of claim 2, further comprising a second connection wire on the first surface of the base substrate,
wherein the second electrode strip is electrically connected with the touch control circuit through the second connection wire.

5. The touch panel of claim 2, wherein the first electrode strip and the second electrode strip are insulated from each other.

6. The touch panel of claim 5, wherein the base substrate is made of an insulating material and provided with second through holes, and a connection bridge is provided on the second surface of the base substrate,
wherein the second electrode strip is disconnected as two second electrode segments at a position where the second electrode strip overlaps the first electrode strip, the second through holes are respectively provided at positions of the base substrate corresponding to adjacent ends of the two second electrode segments, and
wherein the two second electrode segments are electrically connected to each other through the second through holes and the connection bridge.

7. The touch panel of claim 5, wherein the base substrate is made of an insulating material and provided with second through holes, and a connection bridge is provided on the second surface of the base substrate,
wherein the first electrode strip is disconnected as two first electrode segments at a position where the first electrode strip overlaps the second electrode strip, the second through holes are respectively provided at positions of the base substrate corresponding to adjacent ends of the two first electrode segments, and
wherein the two first electrode segments are electrically connected to each other through the second through holes and the connection bridge.

8. The touch panel of claim 1, wherein a conductive layer is provided in the first through hole to electrically connect the touch sensing electrode and the first connection wire.

9. The touch panel of claim 1, wherein the first connection wire is made of any of indium tin oxide, grapheme and silver nanowire.

10. A display apparatus, comprising the touch panel of claim 1.

11. The display apparatus of claim 10,
wherein a projection of the first electrode strip on the base substrate at least partially overlaps a projection of the first through hole on the base substrate.

12. The display apparatus of claim 11, wherein the first through hole comprises a plurality of first through holes, and a projection of the second electrode strip on the base substrate at least partially overlaps a corresponding one of the plurality of first through holes on the base substrate.

13. The display apparatus of claim 11, wherein the touch panel further comprises a second connection wire on the first surface of the base substrate,
wherein the second electrode strip is electrically connected with the touch control circuit through the second connection wire.

14. The display apparatus of claim 11, wherein the first electrode strip and the second electrode strip are insulated from each other.

15. The display apparatus of claim 14, wherein the base substrate is made of an insulating material and provided with second through holes, and a connection bridge is provided on the second surface of the base substrate,
wherein the second electrode strip is disconnected as two second electrode segments at a position where the second electrode strip overlaps the first electrode strip, the second through holes are respectively provided at positions of the base substrate corresponding to adjacent ends of the two second electrode segments, and
wherein the two second electrode segments are electrically connected to each other through the second through holes and the connection bridge.

16. The display apparatus of claim 14, wherein the base substrate is made of an insulating material and provided with second through holes, and a connection bridge is provided on the second surface of the base substrate,
wherein the first electrode strip is disconnected as two first electrode segments at a position where the first electrode strip overlaps the second electrode strip, the second through holes are respectively provided at positions of the base substrate corresponding to adjacent ends of the two first electrode segments, and
wherein the two first electrode segments are electrically connected to each other through the second through holes and the connection bridge.

17. The display apparatus of claim 10, wherein the first connection wire extends in the touch area and exits at the side of the touch area, thereby electrically connecting with the touch control circuit.

18. The touch panel of claim 1, wherein the first connection wire extends in the touch area and exits at the side of the touch area, thereby electrically connecting with the touch control circuit.

19. A manufacturing method for a touch panel having a touch area and a non-touching area at a side of the touch area, comprising:
forming a through hole in a base substrate having a first surface and a second surface opposite to each other;
forming a conductive layer in the through hole;

forming a touch sensing electrode on the first surface of the base substrate, the touch sensing electrode being provided corresponding to the touch area;

forming a connection wire on the second surface of the base substrate; and providing a touch control circuit in the non-touching area, wherein the touch sensing electrode is formed to be electrically connected with the connection wire through the through hole, and the connection wire is formed to be electrically connected with the touch control circuit, and wherein the touch sensing electrode is formed to comprise a first electrode strip and a second electrode strip arranged perpendicular to each other, the first electrode strip extending in a row direction, the second electrode strip extending in a column direction.

20. The method of claim 19, wherein the conductive layer is formed in the through hole through an electroplating process.

\* \* \* \* \*